2,847,421
ASCORBIC ACID INTERMEDIATES

Alfred A. D'Addieco, Grand Island, N. Y., assignor to E. I. du Pont de Nemours and Company, Wilmington, Del., a corporation of Delaware No Drawing. Application December 13, 1956
Serial No. 627,979

1 Claim. (Cl. 260—340.7)

This invention relates to the production of intermediates in the synthesis of ascorbic acid from D-sorbitol and particularly concerns 3,5,4,6-diethylidene-L-gulonic acid and its simple esters and salts.

A commercially important starting material for making 2-keto-L-gulonic acid, the immediate precursor of vitamin C, is based on L-sorbose which already has a keto group in the 2 position on the six carbon chain. The L-threo configuration is protected by acetalizing with acetone (or some other simple carbonyl compound) to give diacetone-L-sorbose. This intermediate is then chemically oxidized to yield the corresponding diacetone-2-keto-L-gulonic acid which in turn is hydrolyzed to obtain the free acid. This route suffers the outstanding disadvantage that the L-sorbose must be obtained by the cumbersome bacterial oxidation of D-sorbitol for practical reasons.

A very good starting material for the synthesis of ascorbic acid would be D-sorbitol which is commercially available and relatively inexpensive. A major difficulty with the synthesis from sorbitol is the protection of the L-threo grouping, especially carbons 4 and 5 of the final ascorbic acid during the oxidation steps so as to produce the isomer which has the proper configuration required for the physiologically important vitamin C.

Accordingly, it is the object of this invention to prepare useful intermediates which will protect the four hydroxyl groups on D-sorbitol which become the 3,4,5, and 6 hydroxyl groups in ascorbic acid. A further object is to prepare 3,5,4,6-diethyl-idene-L-gulonic acid, its homologs and its derivatives. Other objects will be apparent in the further discussion of the invention.

This invention involves the preparation of the diethylidene or bisethylidene derivative of D-sorbitol by reacting an aqueous solution of D-sorbitol with paraldehyde in the presence of sulfuric acid according to the method of Hockett and Schaefer, J. Am. Chem. Soc., 69, 849 (1947). The diethylidene D-sorbitol so obtained is then subjected to careful oxidation at 50° C. and a pH of 7 to 8 by the application of an excess of oxygen in the presence of platinum dispersed on carbon to produce 3,5,4,6-diethylidene-L-gulonic acid which later compound is then converted according to known methods to L-ascorbic acid.

This invention also encompasses the preparation of the bismethylene and bisisopropylidene derivates of D-sorbitol with formaldehyde and acetone respectively. Oxidation of these derivatives leads to the formation of 3,5,4,6-bismethylene-L-gulonic acid and 3,5,4,6-bisisopropylidene-L-gulonic acid respectively. These gulonic acid derivatives are convertible to L-ascorbic acid by known methods.

The synthesis in which the diethylidene groupings protect the essential L-threo grouping can be envisaged according to the following scheme:

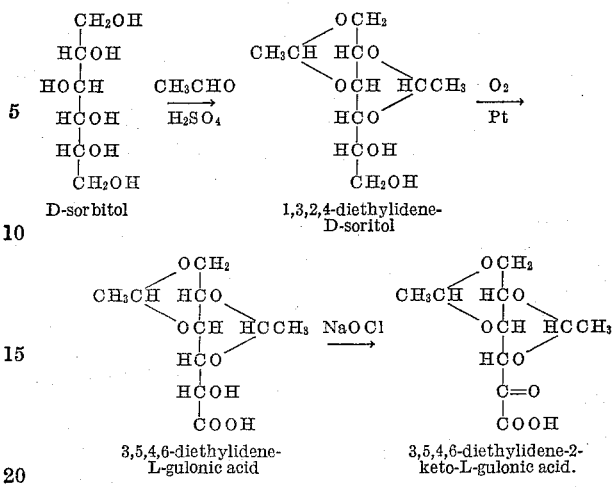

The following examples illustrate my invention and are not to be considered as limiting the scope of my ideas.

Example 1.—Preparation of 3,5,4,6-diethylidene-L-gulonic acid 10 grams of 1,3,2,4-diethylidene-D-sorbitol and 0.90 gram of sodium bicarbonate were dissolved in about 250–300 ml. of water, and 2 grams of fresh 15% platinum on charcoal catalyst was suspended in this solution. A vigorous stream of oxygen was passed through the stirred mixture with the gas inlet tube extending down to the bottom of the reaction flask. The reaction temperature was maintained at 50° C. by means of a thermally regulated water bath, and pH readings were taken periodically. Whenever the pH dropped to a value of about 7, another 0.90 gram portion of sodium bicarbonate was added. Four such additions were made leaving a 25% excess of sodium bicarbonate when the reaction was complete. The reaction was concluded (2.5–4 hours) when the pH readings remained constant after the final addition of sodium bicarbonate.

The catalyst was separated by filtration and washed with small portions of water. The colorless filtrate and washings combined were then passed through a column, 22 mm. in diameter, containing 200 ml. of "Amberlite" IRA–410 anion exchange resin (hydroxide form). A clear colorless effluent was obtained which was basic due to the presence of sodium hydroxide. This effluent was discarded, and the resin was washed with water until free of base. The diethylidene-L-gulonic acid was then eluted from the resin with 25% (by volume) acetic acid, and 2 liters of effluent was collected.

After evaporation of the solvent in vacuo under nitrogen the crude product was obtained as a powdery solid in 65–73% yield. One recrystallization of the crude material from a mixture of ethanol and cyclohexane gave nearly pure diethylidene-L-gulonic acid, M. P. 173–174° C., with 50–70% recovery based on the 1,3,2,4-diethylidene-D-sorbitol.

It was found that the melting point of diethylidene-L-gulonic acid was dependent upon rate of heating. When the bath was heated too rapidly, a melting point as high as 182–183° C. was observed. The melting point recorded above was observed when the bath temperature was raised at a rate of 1–1.5° C. per minute.

A sample of crude diethylidene-L-gulonic acid recrystallized twice from a cyclohexane-ethanol mixture had a constant melting point of 173.5–174° C.

Analysis.—Calculated for $C_{10}H_{16}O_7$: C, 48.38; H, 6.49. Found: C, 48.63; H, 6.31. Neutral equivalent—Calculated: 248. Found: 253.

Since diethylidene-L-gulonic is a new composition of matter its identity was established by acid hydrolysis to a known substance, L-gulono-γ-lactone, in the following manner: 2.0 grams of the pure diethylidene-L-gulonic acid was dissolved in 30 ml. of 3 N hydrochloric acid and the solution was heated on a steam bath under nitrogen for one hour. At the end of this time, the solution was poured on cracked ice, and then treated with decolorizing charcoal. After removal of the charcoal by filtration, the colorless filtrate was concentrated to a syrup. Upon triturating this syrup with 60% ethanol, it crystallized to dense fine white crystals. The crystals were collected and washed with cold 60% ethanol. By repeated concentration of the mother liquors, three crops of crystals totalling about 0.5 gram were collected.

The first crop without any further purification had the following properties: M. P. 185–186.5° C., $(\alpha)_D^{22}$ (c. 0.4 in $H_2O$) +53.13.

Analysis.—Calculated for $C_6H_{10}O_6$: C, 40.45; H, 5.66. Found: C, 40.40; H, 5.46.

The properties of an authentic sample of D-gulono-γ-lactone (Pfanstiehl) measured at the same time were M. P. 186–187° C., $(\alpha)_D^{22}$ (c. 0.4 in $H_2O$) —53.38 indicating that the hydrolysis product was its mirror image or L-gulono-γ-lactone.

*Example 2.—Preparation of 3,5,4,6-diethylidene-L-gulonic acid—alternative method of isolation*

The oxidation was conducted as in Example 1 except that 20 g. of the diethylidene-D-sorbitol, 4 g. of catalyst and a total of 9 g. of sodium bicarbonate were used. Isolation of the product was carried out as follows:

After removal of the catalyst by filtration, the aqueous solution was concentrated to a volume of 70–80 ml. by distillation in vacuo. The concentrated solution was quantitatively transferred to a 600 ml. beaker which was immersed in an ice-water bath. A pair of pH electrodes and a glass stirrer, mechanically operated, were inserted into the beaker. A standard solution of 1 N hydrochloric acid was added to the concentrated reaction mixture with vigorous stirring to convert the sodium diethylidene-L-gulonate to diethylidene-L-gulonic acid and sodium chloride. The hydrochloric acid was added until the desired pH was attained in the titration.

The aqueous solution containing the diethylidene-L-gulonic acid was frozen and lyophilized to remove the water. When it was apparent that most of the water had been removed from the residue, the latter was maintained under a vacuum for an additional 18 hours to insure complete removal of water.

Commercial absolute ethanol was added to the residue which consisted of diethylidene-L-gulonic acid and sodium chloride. The alcoholic solution was then placed in a freezing compartment which was well below 0° C. to reduce the solubility of the sodium chloride. After 2–3 hours, the alcoholic solution was filtered by suction. The weight of the dry sodium chloride separated was nearly quantitative.

The alcoholic solution was distilled in vacuo to remove the ethanol. An ebullator tube through which nitrogen was passed was used to maintain steady boiling. The distillation was carried out at room temperature using only a stream of air to heat the distilling flask. A vacuum was applied to the flask for about 18 hours after it was apparent that most of the ethanol had been removed. At the end of this period, the product was scraped from the flask. This procedure gave 18.5–20.3 grams of an alcohol-free crude product which melted over a 1.5° range between 160–167° C. The crude yield was 87–95% of theory.

*Example 3.—Preparation of methyl-3,5,4,6-diethylidene-L-gulonate*

3.0 grams of pure diethylidene-L-gulonic acid was dissolved in a solution of 100 ml. of ether and 20 ml. of methanol, and an excess of diazomethane in ether was added. The excess diazomethane was boiled off by gentle warming on a steam bath and the solvent was removed in vacuo under nitrogen. Crystalline white methyl-diethylidene-L-gulonate was obtained in quantitative yield. The product, which melted at 144–145.5° C., required no further purification.

Analysis.—Calculated for $C_{11}H_{18}O_7$: C, 50.38; H, 6.92. Found: C, 50.48; H, 6.72.

*Example 4.—Oxidation of 3,5,4,6-diethylidene-L-gulonic acid to 3,5,4,6-diethylidene-2-keto-L-gulonic acid and hydrolysis of the latter to 2-keto-L-gulonic acid*

0.496 gram of pure diethylidene-L-gulonic acid dissolved in 25 ml. of water was neutralized with 20 ml. of 0.1 N sodium hydroxide and 2.1 ml. of 0.954 molar aqueous sodium hypochlorite was added. A solution of 0.2 gram of $NiCl_2 \cdot 6H_2O$ in 50 ml. of water was then added and the reaction mixture was heated at 50–60° C. with stirring. At the end of 20 minutes all the hypochlorite was consumed as indicated by testing with starch-iodide paper. The catalyst was separated by filtration, and the colorless filtrate which contained the sodium salt of 3,5,4,6-diethylidene-2-keto-L-gulonic acid was transferred to a flask equipped with a gas inlet tube. 2.8 ml. of 1 N hydrochloric acid was added and nitrogen was passed through the solution with heating at 100° C. for 3.5 hours. The acetaldehyde produced by hydrolysis of the ethylidene groups of diethylidene-2-keto-L-gulonic acid was swept out of the solution by the gas stream as it was formed.

Half of the remaining solution was withdrawn and analyzed for 2-keto-L-gulonic acid by the Shaffer-Hartmann method for determining reducing sugars as outlined in J. Biol. Chem. 45, 365 (1921). A 33% yield of 2-keto-L-gulonic acid was obtained.

The other half of the reaction solution was frozen and then lyophilized to a dry residue. The residue was dissolved in about 5 ml. of water and the presence of 2-keto-L-gulonic acid in this solution was definitely established by paper chromatographic analysis in the following manner:

A small quantity of the solution was introduced in the form of a circular spot near the bottom of a strip of Whatman #1 filter paper about 10″ long. The paper was suspended vertically in a battery jar containing a layer of solvent mixture comprised of normal butanol (40%), acetic acid (10%) and water (50%) so that the bottom edge of the paper was immersed in the solvent. The battery jar was covered with a glass plate in order to maintain the inside atmosphere in a condition of saturation both with respect to water and to the solvent. A sharp horizontal liquid front formed which advanced almost to the top of the paper in about 9 hours after which the paper was dried first in air and then at 100° C. for 15 minutes. The new position of the reducing sugar component of the reaction solution was then rendered visible by spraying the paper with Benedict's solution. A sharply bounded colorless spot on a light blue background with $R_F$ value of 0.182 was obtained.

That this reducing sugar was in fact 2-keto-L-gulonic acid was proven by preparing a similar chromatogram of an authentic sample of 2-keto-L-gulonic acid prepared by a literature route and determining its $R_F$ value. The $R_F$ value of 2-keto-L-gulonic acid was found to be 0.182.

Another paper chromatogram of the same reaction solution prepared as described above was sprayed with 2% o-phenylenediamine dihydrochloride in 80% alcohol, a reagent which is known to give a characteristic greenish-gray spot for a 2-keto acid[2]. The color of the spot observed was identical with that obtained by similar treatment of a chromatogram of a sample of 2-keto-L-gulonic acid made by methods adapted from these literature references:

P. B. Report 74410, E. Merck, Darmstadt, "Production of Drugs and Pharmaceuticals," 1938–1947, Frame #151.

Strukov and Kopylova, Farmatsiya, 10, No. 3, 8–12 (1947); Chem. Zentr. (Russian Zone Ed.), I, 135 (1948); C. A., 44, 8327.

Reichstein and Grüssner, Helv. Chim. Acta, 17, 324 (1934).

The oxidation of diethylidene-D-sorbitol to diethylidene-L-gulonic acid can be carried out at temperatures ranging from 25 to 70° C. At higher temperatures considerable degradation may take place. The preferred temperature range is 40–60° C.

For the practice of my invention it is necessary to protect the hydroxyl groups on carbons 3,4,5 and 6 of D-sorbitol. This is best done by preparing a bis-methylene derivative and the preferred derivatives result from combining two molecules of a compound having the general formula

in which R and R' are hydrogen or methyl with D-sorbitol to produce the 3,5,4,6-bis-methylene derivative. This derivative of D-sorbitol has then a terminal group —CHOH·CH$_2$OH which is oxidizable to the terminal group —CO·COOH which is the keto-acid group required for converting the D-sorbitol into the immediate precoursor for vitamin C. The oxidation is preferably conducted in two steps of which the first step results in the bis-methylene gulonic acid derivative with the terminal group —CH$_2$OH·COOH. The second oxidation step then converts the terminal group to —CO·COOH.

Diethylidene-L-gulonic acid is insoluble in nonpolar solvents such as ether, benzene and cyclohexane, and readily soluble in polar solvents such as water, methanol, and ethanol. This new acid is valuable as an intermediate in the synthesis of vitamin C. It may be oxidized to the corresponding 2-keto-L-gulonic acid derivative by known methods for the oxidation of an α-hydroxy acid to an α-keto acid. The 2-keto-L-gulonic acid derivative may in turn be converted to the vitamin by hydrolysis, lactonization and enolization since it is well known that 2-keto-L-gulonic acid or its hydrolyzable derivatives can be readily transformed into vitamni C.

Methyl diethylidene-L-gulonate, a new compound, is also useful as an intermediate for the synthesis of vitamin C. It may be oxidized to the corresponding methyl-2-keto-L-gulonate derivative which after hydrolysis of the protective acetal groups can be converted to vitamin C according to methods described in the prior art.

The oxidation of bismethylene-, bisethylidene-, or bisisopropylidene-L-gulonic acid to the corresponding 2-keto-L-gulonic acid can be carried out at room temperature perhaps at a slower rate. Reaction temperatures much higher than 70° C. may cause degradation of the sugar acids.

The 3,5,4,6-bisethylidene-L-gulonic acid as well as the methylene and isopropylene anologs form salts with inorganic bases and alkyl esters with alcohols. Salts of special utility in various possible processes for synthesizing ascorbic acid intermediates are those of the alkali metals and the alkaline earth metals and lead. Of particular interest are the sodium, potassium, calcium and barium salts. The esters of interest are those of saturated alcohols of four or less carbon atoms such as methanol, ethanol, proponal and n-butanol. The corresponding salts and esters of 3,5,4,6-diethylidene-2-keto-L-gulonic acid as well as of the methylene and isopropylene anologs can also be prepared and have similar utility in the preparation of ascorbic acid intermediates.

Various noble metal catalysts, such as platinum, palladium and their mixtures are suitable catalysts for the oxidation of 1,3,2,4-diethylidene-D-sorbitol to the gulonic acid of this invention. Both air and oxygen are suitable as oxidizing agents.

The conversion of the gulonic acid to the keto acid (3,5,4,6-diethylidene-2-keto-L-gulonic acid) can be accomplished in general by reagents capable of converting an α-hydroxy carboxylic acid to the corresponding α-keto acid. Such conversion must take place in media which will not result in the loss of the protective groups by hydrolysis. In general alkaline media are preferred, however mildly acidic media e. g. acetic acid may also be employed. Some suitable agents for this conversion are Fenton's Reagent, alkali hypochlorite and alkali permanganate. However, this invention is not limited to any specific oxidation or conversion agents.

In the preparation of 3,5,4,6-diethylidene-L-gulonic aicd and its anologs from the sorbitol it is preferable to maintain a pH in the neutral zone, preferably between about 7 and 9. Sodium bicarbonate is a good reagent for maintaining proper pH control. However, the invention is not limited to this reagent; other means may be employed, such as the careful addition of caustic soda, potash or other chemical agents permitting proper control of the hydrogen ion concentration during the oxidation step from the sorbitol to the gulonic acid derivative of this invention.

This application is a continuation of my copending application Serial Number 365,291, filed June 30, 1953, now abandoned.

I claim:

In the conversion of 1,3,2,4-bisethylidene-D-sorbitol to 3,5,4,6-bisethylidene-L-gulonic acid the steps which comprise oxidizing said sorbitol in aqueous solution with oxygen in the presence of a platinum catalyst at a temperature between 40 to 60° C. and maintaining the reaction mixture at a pH between about 7 and 8 by the addition thereto of sodium bicarbonate.

References Cited in the file of this patent

UNITED STATES PATENTS

| | | |
|---|---|---|
| 2,265,121 | Reichstein | Dec. 2, 1941 |
| 2,491,065 | Van Eekelen et al. | Dec. 12, 1949 |

OTHER REFERENCES

Heyns et al.: Annalen, vol. 558, pages 849–851 (1947).